J. N. Fordyce.
Harrow.
Nº 67,835.                    Patented Aug. 13, 1867.
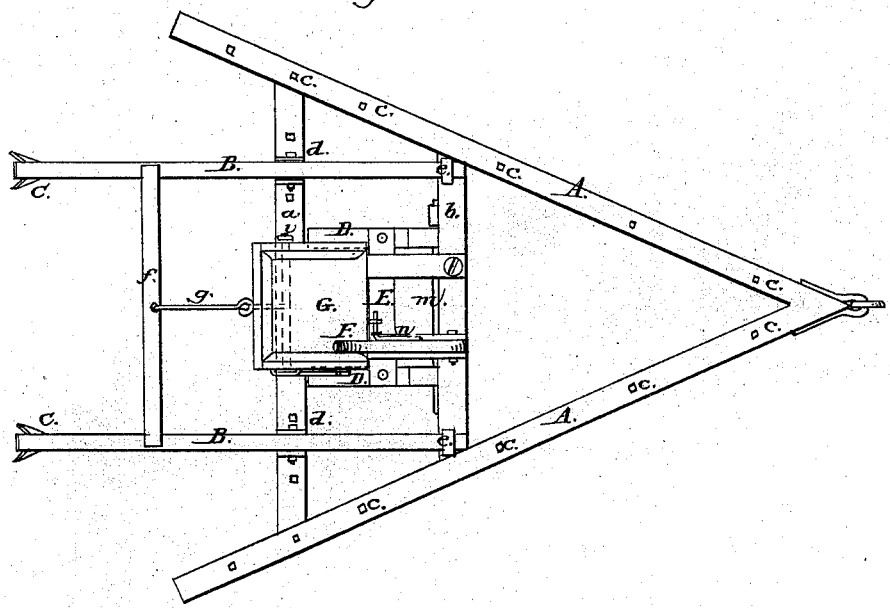
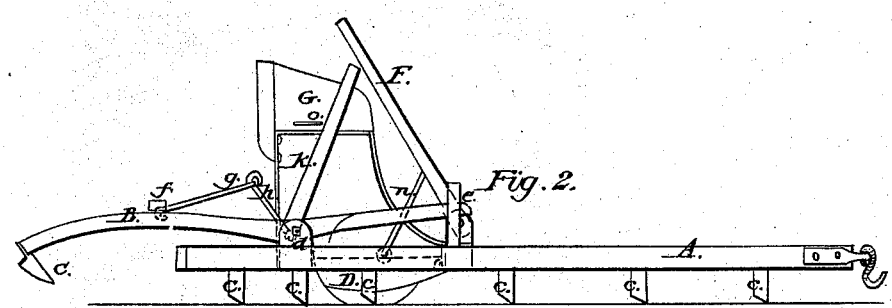
Witnesses:
W. Burris
James E. Blih
Inventor:
John N. Fordyce
by G. B. Towles
atty.

United States Patent Office.

JOHN N. FORDYCE, OF CAMBRIDGE, OHIO.

Letters Patent No. 67,835, dated August 13, 1867.

---

IMPROVEMENT IN HARROWS.

---

*The Schedule referred to in these Letters Patent and making part of the same.*

---

TO ALL WHOM IT MAY CONCERN:

Be it known that I, JOHN N. FORDYCE, of Cambridge, in the county of Guernsey, and State of Ohio, have invented a new and improved Steel-Tooth Riding-Harrow and Furrower; and I do declare that the following is a full, clear, and exact description of the construction and operation of the same, reference being had to the accompanying drawings, making a part of this specification, in which- Figure 1 is a top view.
Figure 2 is a side view.
Like letters in the two figures of the drawings indicate like parts.

The nature of my invention consists, first, in combining an adjustable furrower with a harrow, and the arrangement of a lever by which the furrower may be thrown in or out of use, as may be required; second, in providing the harrow with a seat for the driver, and with a jack, by means of which the harrow may be readily raised to pass over stumps, stones, or other obstructions, and the teeth may be raised out of the ground when the harrow is being turned around; third, in the construction of the teeth of steel, the front edges of which are thin and sharp enough to cut their way more easily than the ordinary harrow-teeth.

To enable others skilled in the art to make and use my invention, I will proceed to describe its construction and operation.

A is the frame of a triangular harrow, the sides of which are nine (9 feet) feet long, and are mitred and properly secured together in front. The back ends are six feet (6 feet) apart, and secured by the cross-bars $a$ and $b$. The teeth $c\ c\ c\ c\ c\ c$ are made of steel, four inches long below the frame, one and three-fourths inch ($1\frac{3}{4}$ inch) wide, and three-fourths of an inch ($\frac{3}{4}$ inch) thick on the rear edge, the front parts being finished with a thin sharp edge, the lower ends being rounded back so as to form a sharp point in front, as clearly seen in fig. 2. These teeth or cutters are all arranged in the frame so that their sides are parallel with each other, and, as nearly as may be, parallel with the right-line forward movement of the harrow. B B are the beams of the furrower, having properly attached, at rear ends, the steel moulds or shovels C C, the beams being properly attached by a bolt to the cast-iron clasps or saddles $d\ d$, the forward ends passing through the staples $e\ e$, which are long enough to allow the required motion of the beams. The rear ends are secured by the slat $f$, to which are attached the jointed lever-rods $g\ h$, which connect with the small roller $i$, and are operated by the lever $k$, and by means of which the furrower is, by the driver, thrown in or out of use, as required. D D are the bobs or runners of a jack, secured together by cross-bar E. The front ends of the bobs are secured or hinged by iron straps to the rod $m$, and these bobs or runners are connected by the rod $n$ to the lever F, by means of which the harrow may be readily raised over stumps or other obstructions, or the teeth raised out of the ground to facilitate the turning of the harrow. G is a seat for the driver, secured to the cross-bars $a$ and $b$ by proper stays, and provided with staple O to secure lever $k$.

Operation.

The teeth being thin and sharp, as described, they cut their way through the hard clods or small roots more readily than the ordinary harrow-teeth, and leave the ground in perfectly smooth order. The levers are arranged so that the driver can readily reach them, and with lever $k$ he adjusts the furrowers, throwing them in or out of use, as required, while with lever F attached to jack D D he can raise the harrow over stumps or other obstructions, or raise the teeth out of the ground to facilitate the turning of the harrow. The furrowers may be arranged any required distance apart, and being thus combined with and attached to the harrow are a great saving of labor and time, and by lever $k$ can be thrown out of use at pleasure, or entirely detached when it is desired to use the harrow without the furrower.

Claims.

Having thus fully described my invention, what I claim therein as new, and desire to secure by Letters Patent, is—

1. The combination of an adjustable furrower with a harrow, substantially in the manner and for the purposes as herein described.

2. The arrangement of the rods $g\ h$, roller $i$, clasps $d\ d$, staples $e\ e$ and $o$, in combination with the furrowers and with the seat, substantially in the manner and for the purposes as herein described.

3. The jack D D operated by lever F, substantially in the manner and for the purposes as herein described.

JOHN N. FORDYCE.

Witnesses:
MARTIN ST. JOHN,
ARNET WILLIAMS.